US008751923B2

(12) United States Patent
Nagao

(10) Patent No.: US 8,751,923 B2
(45) Date of Patent: Jun. 10, 2014

(54) IMAGE PROCESSING APPARATUS, IMAGE PROCESSING METHOD, AND STORAGE MEDIUM

(75) Inventor: Keisuke Nagao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 391 days.

(21) Appl. No.: 12/823,903

(22) Filed: Jun. 25, 2010

(65) Prior Publication Data

US 2010/0332999 A1    Dec. 30, 2010

(30) Foreign Application Priority Data

Jun. 30, 2009   (JP) .................................. 2009-155311

(51) Int. Cl.
*G06F 17/27*   (2006.01)

(52) U.S. Cl.
USPC .......................................... 715/234; 715/247

(58) Field of Classification Search
USPC ................................ 715/234, 247
See application file for complete search history.

(56) References Cited

U.S. PATENT DOCUMENTS

| 6,981,213 | B2 * | 12/2005 | Barmettler | 715/241 |
|---|---|---|---|---|
| 7,640,494 | B1 * | 12/2009 | Chen et al. | 715/234 |
| 7,899,829 | B1 * | 3/2011 | Malla | 707/741 |
| 2003/0154252 | A1 * | 8/2003 | Inose | 709/205 |

FOREIGN PATENT DOCUMENTS

| JP | 2006-171851 | * | 6/2006 | G06K 9/03 |
| JP | 2006-171851 A | | 6/2006 | |

OTHER PUBLICATIONS

SnagIt User's Guide; 2002; TechSmith Corp.; pp. 1-81.*
Sue Chastain; TechSmith SnagIt 9 Screen Capture Utility for Windows; Oct. 2, 2008; About.com; pp. 1-2.*

* cited by examiner

*Primary Examiner* — Andrew Dyer
(74) *Attorney, Agent, or Firm* — Canon USA Inc IP Division

(57) ABSTRACT

An image processing apparatus acquires information indicating a region to be output designated by a user in a web page displayed on a display apparatus by a browser, and extracts data indicating an image corresponding to at least a part of the region to be output indicated by the acquired information. The image processing apparatus updates a portion from which data is extracted in the region to be output based on the acquired information, when a portion corresponding to the extracted data of the region to be output indicated by the acquired information in the web page is a part of the region to be output.

13 Claims, 10 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus for outputting an image corresponding to a web page.

2. Description of the Related Art

Conventionally, a technique to access a server on the Internet, download a structured document, and display the web page on a display has been known. Structured documents are described with a markup language or a structured language, such as Hyper Text Markup Language (HTML) or Hyper Text Markup Language (XHTML). A user can analyze a structured document by software called as a browser corresponding to the structured language and display a web page on a display. Further, when a user prints such a web page, a method in which the user displays the web page on the display by a browser and prints the displayed page using a function of the browser is commonly used. However, some types of browsers cannot perform rendering of the whole of a web page at one time.

Japanese Patent Application Laid-open No. 2006-171851 discusses a technique in which when a user performs scroll-movement of a document file of a text type different from a web page to convert the document file into an image, capturing is performed on each displayed screen.

However, the aforementioned method is for performing capturing of the whole document file and does not designate a part of regions of the document file as an output target. Further, a technical constraint that the document file is not a web page and a browser cannot perform rendering of the whole web page at one time is not considered.

SUMMARY OF THE INVENTION

The present invention is directed to an image processing apparatus capable of outputting an image corresponding to a region to be output of a web page, even when the image corresponding to the region to be output cannot be extracted by a browser at one time.

According to an aspect of the present invention, an image processing apparatus includes an acquisition unit, an extraction unit, an updating unit, and an output unit. The acquisition unit is configured to acquire information indicating a region to be output designated by a user in a web page displayed on a display apparatus by a browser. The extraction unit is configured to extract data indicating an image corresponding to at least a part of the region to be output indicated by the information acquired by the acquisition unit. When a portion corresponding to the data extracted by the extraction unit of the region to be output indicated by the information acquired by the acquisition unit in the web page is a part of the region to be output, the updating unit is configured to update a portion of the region to be output from which data is extracted by the extraction unit, based on the information acquired by the acquisition unit. The output unit is configured to output an image corresponding to the region to be output, based on data extracted by the extraction unit according to updating by the updating unit and corresponding to the region to be output indicated by the information acquired by the acquisition unit in the web page.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
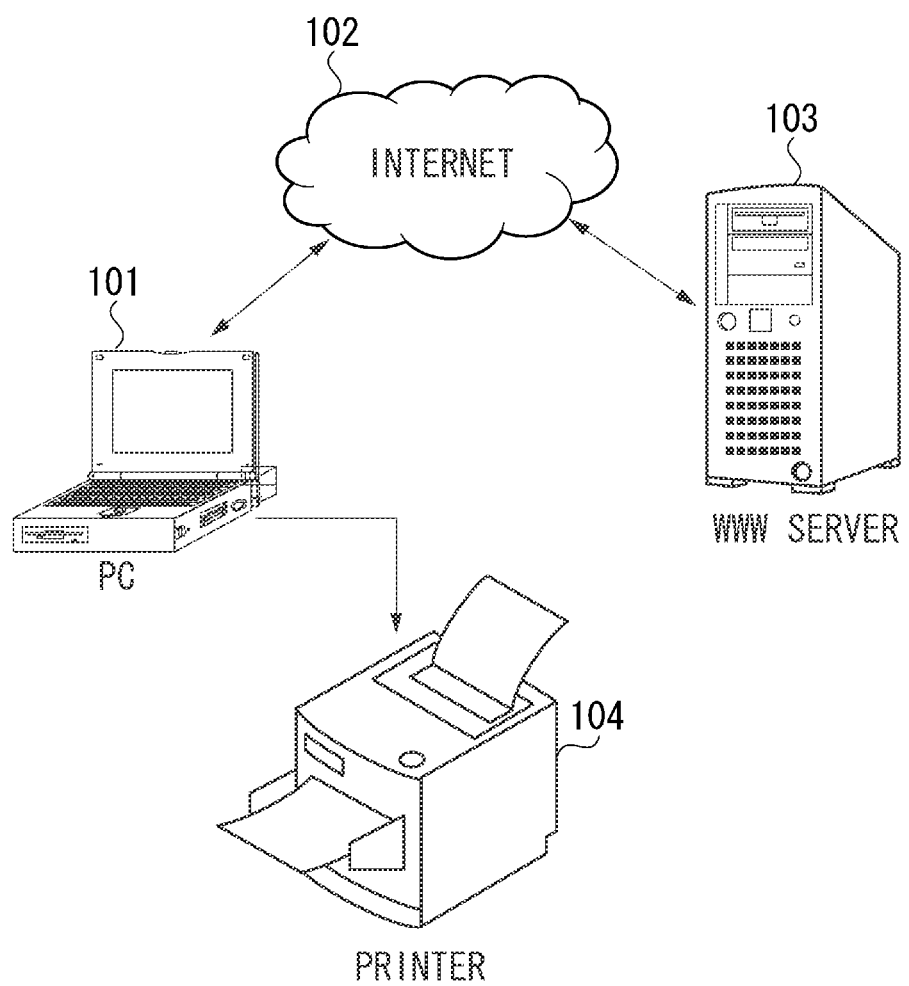
FIG. 1 illustrates a printing system for printing a web page based on a structure document.

FIG. 1 illustrates a printing system for printing a web page based on a structured document. A PC 101, which is an image processing apparatus according to an exemplary embodiment of the present invention, is connected to the Internet 102, and can download web pages from a plurality of World Wide Web (WWW) servers 103 on the PC 101 via the Internet 102 to display the web pages. A web page is a structured document described by a markup language (structured language) such as HTML and XHTML, and is displayed based on a written content thereof. Further, the PC 101 connects to a local printer 104 and can download a web page on the WWW server 103 on the PC 101 and print the web page by the printer 104.

Figure 2:
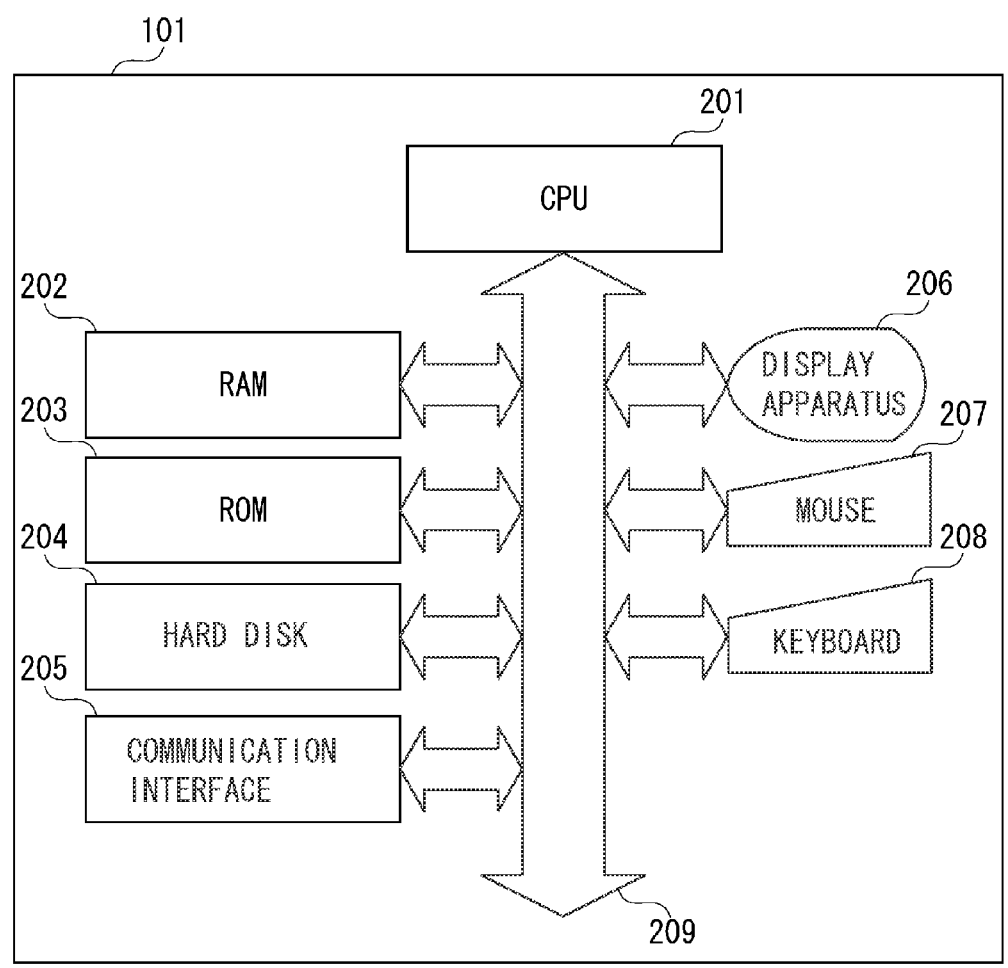
FIG. 2 is a block diagram illustrating a configuration of a personal computer (PC).

FIG. 2 is a block diagram illustrating a configuration of the PC 101. A CPU 201 performs calculation, determination, and control of data and commands according to a program stored in a random access memory (RAM) 202, a read only memory (ROM) 203, or a hard disk 204. The RAM 202 is used as a temporally storage area when the CPU 201 performs various processing. The hard disk 204 stores application software such as an operating system (OS), a browser, and others. The CPU 201 reads a program stored in the ROM 203 or the hard disk 204 into the RAM 202, and performs various control operations by executing the program with the RAM 202 as a work memory.

A communication interface 205 is an interface for performing a data communication with the printer 104 via, for example, a universal serial bus (USB), a small computer system interface (SCSI), or a wireless connection, and a network interface for data communication with the WWW server 103 via the Internet 102. A display apparatus 206 includes a cathode ray tube (CTR) or a liquid display, and a graphic controller, and displays an image or a graphic user interface (GUI) on a display screen. A mouse 207 and a keyboard 208 are input devices for giving various instructions to the PC 101 by a user. A system bus 209 performs data exchange between the CPU 201 and the RAM 202, the ROM 203, and the hard disk 204.

Figure 3:
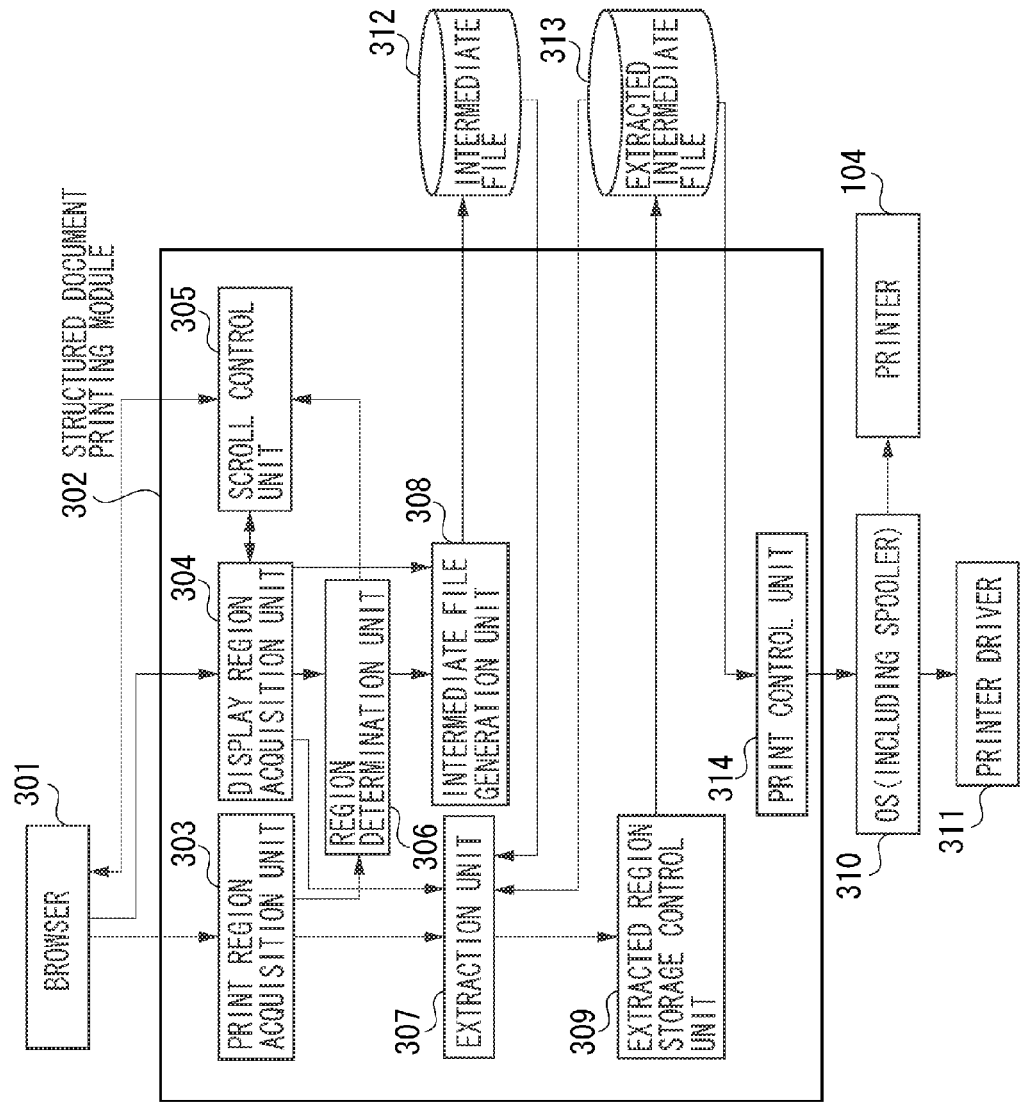
FIG. 3 illustrates a software configuration on a PC.

FIG. 3 illustrates a software configuration on the PC 101. Each block illustrated in FIG. 3 is a program classified in programs stored in the ROM 203 or the hard disk 204 for every function, and the CPU 201 executes these programs.

In FIG. 3, a browser 301 is an application for generating a web page to display the web page. The browser 301 downloads a structured document stored in the WWW server 103 onto the hard disk 204 in the PC 101 and displays a web page on the display apparatus 206. The structured document is written with a markup language such as HTML and XHTML, and elements constituting the structured document such as text and an image are written using tags. Further, another file called as Cascading Style Sheet (CSS) for designating a display style of these elements is designated in the structured document. The browser 301 analyses the structured document and displays the web page, in which elements are arranged based on the CSS, on the display apparatus 206.

In FIG. 3, a structured document printing module 302 is plug-in software invoked from the browser 301. The structured document printing module 302 is executed when the browser 301 receives a printing instruction from a user. When the structured document printing module 302 is executed, a print region acquisition unit 303 acquires information indicating a print region in a web page from the browser 301. The print region is, for example, selected on a web page by a user's operation of the mouse 207. In such a case, the print region acquisition unit 303 acquires coordinates indicating a selected region in the web page. On the other hand, a display region acquisition unit 304 acquires information indicating a region in a web page displayed on the display apparatus 206 from the browser 301.

A region determination unit 306 compares information acquired by the print region acquisition unit 303 and information acquired by a display region acquisition unit 304, and determines a portion in which a display region and a printing region overlap each other in the web page. An intermediate file generation unit 308 acquires information indicating a display region based on a result determined by the region determination unit 306 when there is a portion becoming a print region in the display region. The intermediate file generation unit 308 performs rendering of a display region and generates an image of Enhanced Meta File (EMF) format as an intermediate file 312 and stores the image in the RAM 202. In addition, the intermediate file 312 is an image generated by a usual browser for displaying based on a structured document, and the browser 301 generates bitmap data based on the intermediate file and displays a web page. Further, the intermediate file is of a format storing characters and graphics as vector data, in elements contained in a structured document, such as HTML.

An extraction unit 307 extracts an image of a region overlapping a print region in a display region, in the intermediate file 312 generated by the intermediate file generation unit 308. An extracted region storage control unit 309 stores an image extracted by the extraction unit 307 in the RAM 202 as an intermediate file 313. In addition, when a display region is changed by scrolling, the extraction unit 307 does not extract the intermediate file 313 already stored in the RAM 202 or a region already extracted and stored in the RAM 202 based on a moving amount of scrolling.

In addition, the extraction unit 307 can extract an image in a region overlapping a print region in a display region from bitmap data corresponding to a web page. However, in the case of bitmap data, when an image is enlarged, a detailed portion of the image becomes coarse. Thus, as for image data to be extracted, a format storing character information and graphic information as vector data is preferable instead of bitmap data.

A scroll control unit 305 receives a scroll position indicating a region in a web page displayed on the display apparatus 206 from the browser 301. The scroll control unit 305 can change a region in a web page that is displayed in a display screen of the display apparatus 206 by controlling the browser 301 to move a scroll position. The scroll control unit 305 changes a display region by moving scroll so as to display the whole print region according to a determined result by the region determination unit 306. The display region acquisition unit 304 acquires a display region again from the browser 301 when the scroll control unit 305 performs scrolling to change a display region.

A print control unit 314 executes drawing processing of one or a plurality of intermediate files stored by the extracted region storage control unit 309. An operating system (OS) 310 provides, from the printer driver 311, an Application Programming Interface (API) for performing drawing processing by the structured document print module 302. Further, the OS 310 includes various control software such as a spooler system for managing a print job and a port monitor for outputting a printer command to a port, but a detail description thereof is omitted. The printer driver 311 generates print data according to the drawing processing executed by the print control unit 314, converts the print data into a printer command, and then transmits the printer command to the printer 104 via the OS 310. When the printer 104 receives the printer command from the printer driver 311, the printer 104 prints an image on a print medium based on the print data.

Figure 4A:
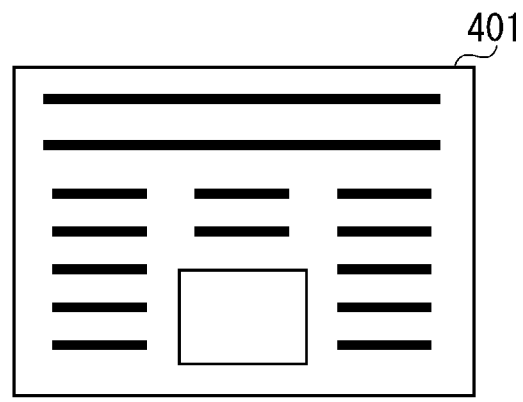
FIGS. 4A and 4B illustrate a relationship between a web page and its display region.
Figure 4B:
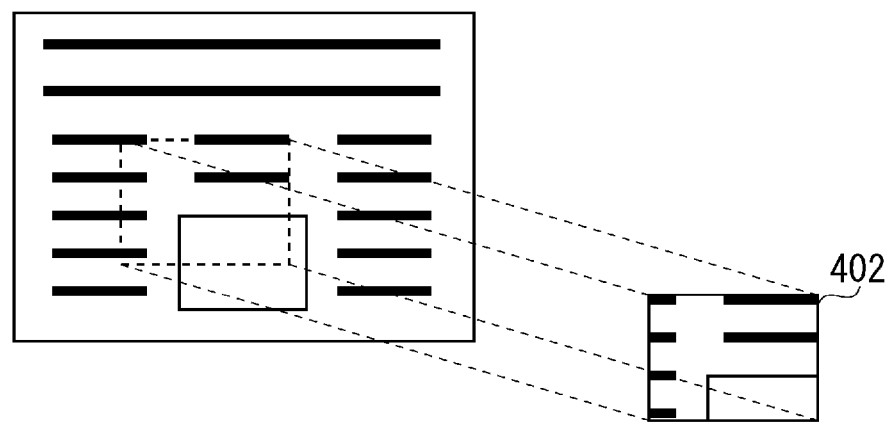

FIGS. 4A and 4B illustrate a relationship between a web page and its display region. FIG. 4A illustrates the whole of a web page 401 based on a structured document file. A part surrounded by a frame line in FIG. 4B illustrates a display region 402, which is a part of the web page actually displayed on a display screen when the browser 301 generates the web page 401.

Figure 5A:
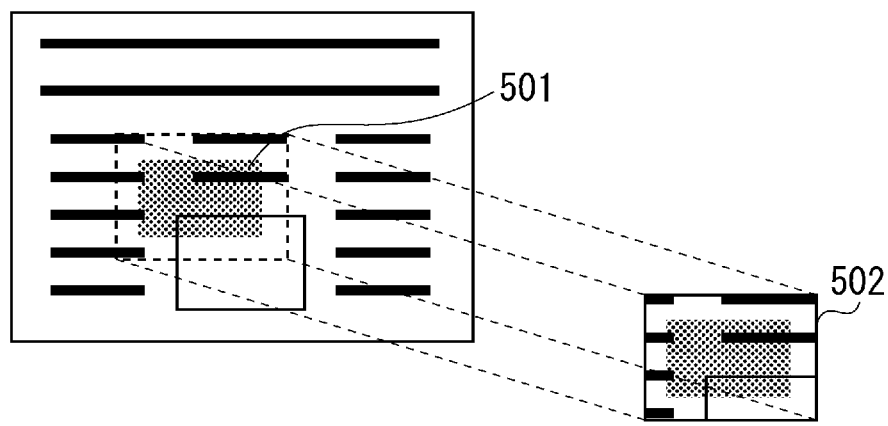
FIGS. 5A and 5B illustrate a relationship between a display region in a web page and a print region.
Figure 5B:
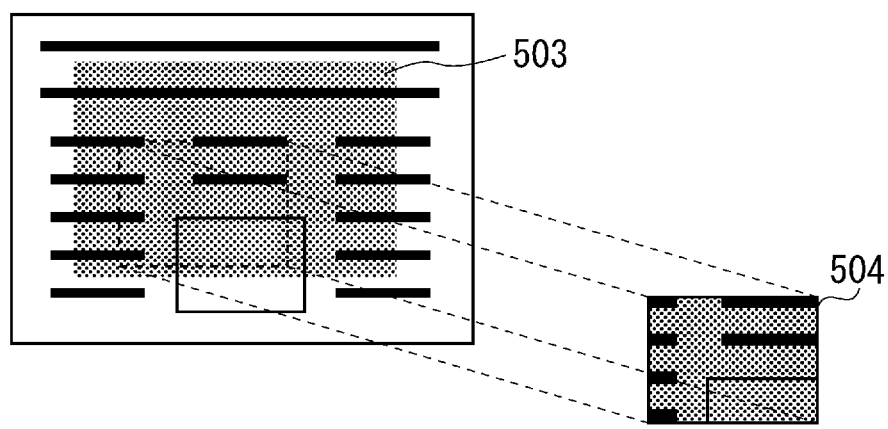

FIGS. 5A and 5B illustrate a relationship between a display region and a print region in a web page. FIG. 5A illustrates a case in which the whole of a print region 501 is contained in a display region 502 displayed on the browser 301. FIG. 5B illustrates a case in which a print region 503 is not contained in a display region 504 displayed on the browser 301.

Figure 6A:
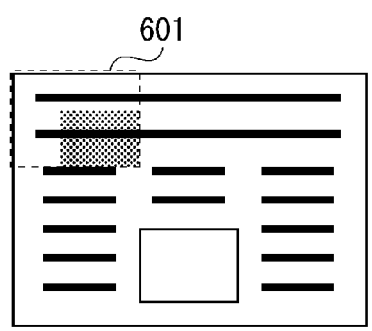
FIGS. 6A to 6C illustrate changes of a display region by a scroll control unit.
Figure 6B:
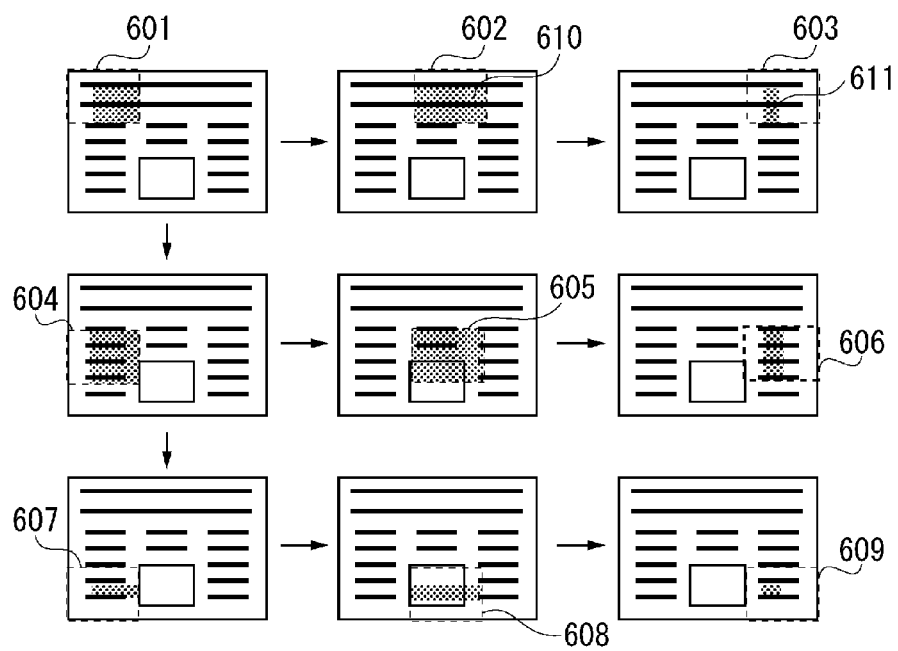
Figure 6C:
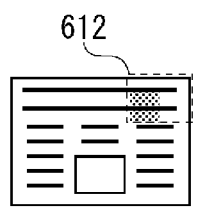
Figure 7:
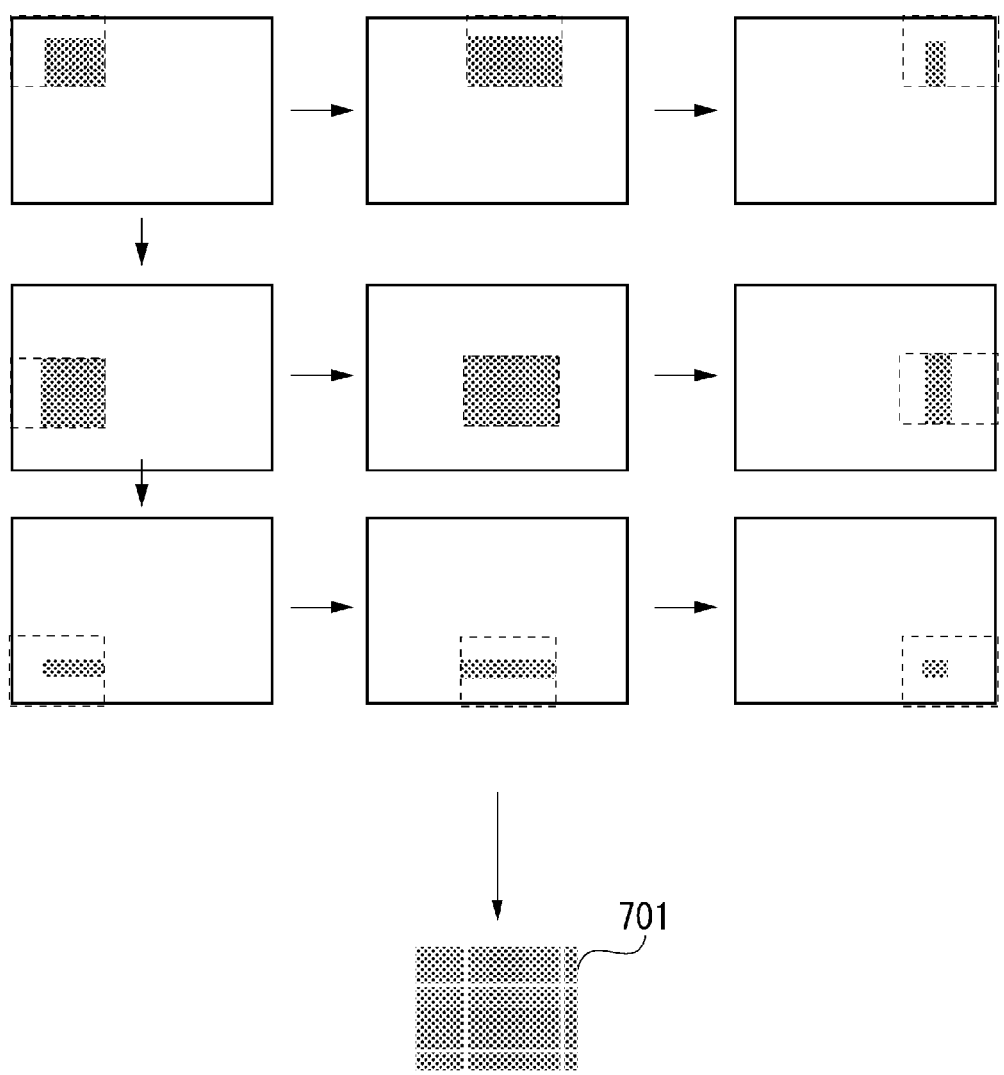
FIG. 7 illustrates a generated intermediate file.

When the print region 503 is larger than the display region 504 as illustrated in FIG. 5B, the scroll control unit 305 moves a scroll position of the browser 301 to change a region displayed on the display apparatus by the browser 301. FIGS. 6A to 6C illustrate changes of a display region by the scroll control unit 305. FIG. 6A illustrates a case in which a display region displayed by the browser 301 is at the upper left corner on the web page. A region illustrated by shading in FIG. 6A is an overlapped region with the display region 601 in the print region 503. FIG. 6B illustrates, for displaying the print region 503 illustrated in FIG. 5B altogether, an example in which the display region is changed by moving the scroll, and a region overlapping the print region is extracted. Further, FIG. 6C illustrates a region 612 overlapping the print region 503 in a display region 603 in FIG. 6B. Furthermore, FIG. 7 illustrates a generated intermediate file.

With reference to FIGS. 5A and 5B, FIGS. 6A to 6C, and FIG. 7 and a flowchart illustrated in FIG. 8, processing for storing an image in a memory will be described, where the image corresponds to a print region according to the present example.

Figure 8:
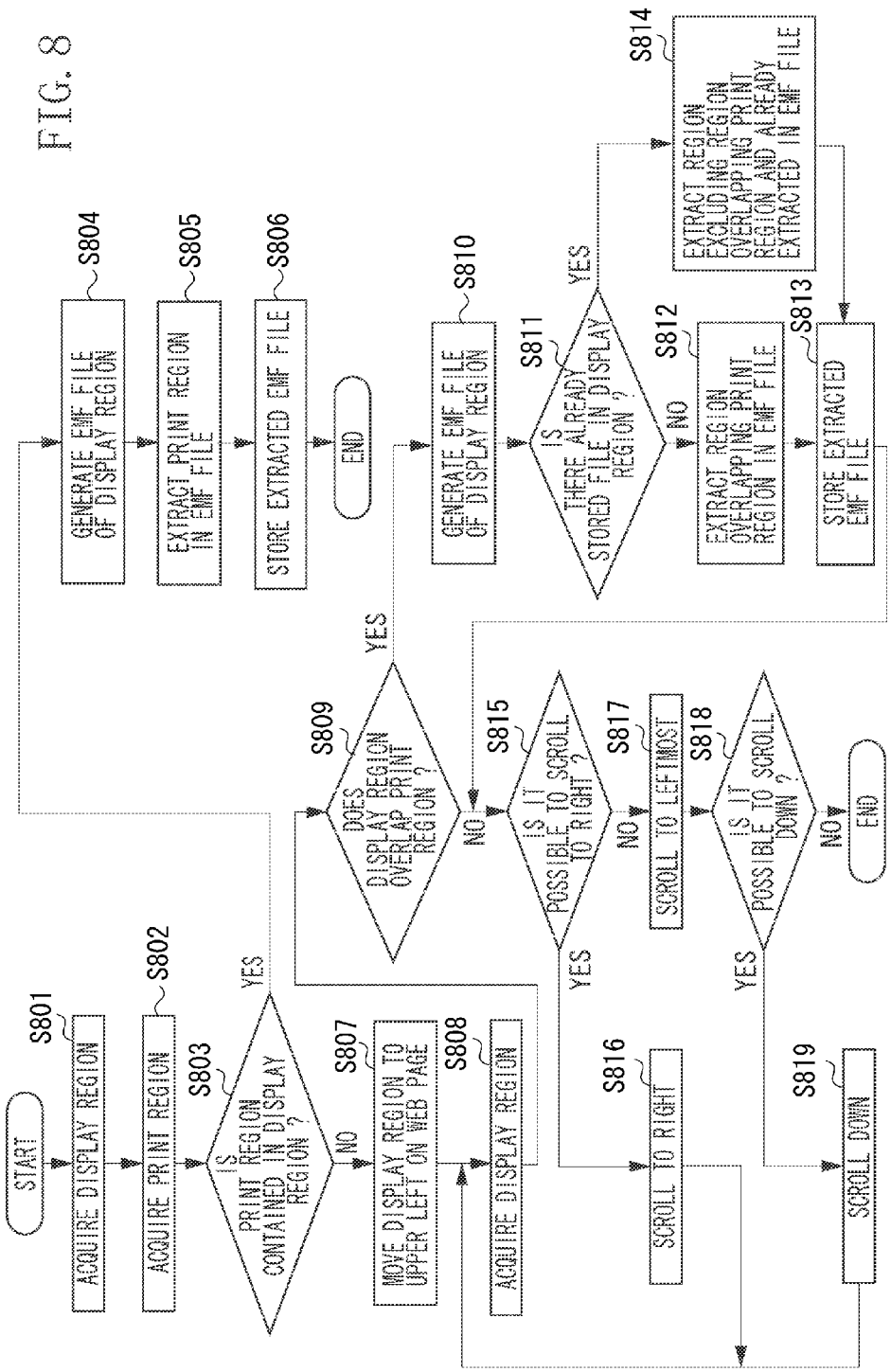
FIG. 8 illustrates processing steps for storing an intermediate file corresponding to a print region.

FIG. 8 illustrates processing steps for storing an intermediate file corresponding to a print region. The CPU 201 performs the processing by executing a program stored in the ROM 203. In addition, the intermediate file has a format of EMF file in the present flowchart. In step S801, the display region acquisition unit 304 acquires a display region from the browser 301. In step S802, the print region acquisition unit 303 acquires a print region from the browser 301.

In step S803, the region determination unit 306 determines whether the print region is contained altogether in the display region. For example, as illustrated in FIG. 5A, when the print region 501 is contained altogether in the display region 502 on the browser 301 (YES in step S803), the processing proceeds to step S804. In step S804, the intermediate file generation unit 308 performs rendering of the display region 502 to generate an EMF file. In step S805, the extraction unit 307 extracts the print region 501 from the EMF file. Finally, in step S806, the extracted region storage control unit 309 stores the extracted EMF file in a memory such as the RAM 202. Based on the stored EMF file by the extracted region storage control unit 309, the print control unit 314 can print the print region 501 by controlling the printer driver 311 to execute drawing processing via the OS 310.

On the other hand, as illustrated in FIG. 5B, when the print region 503 is not contained in the display region 504, as a result of determination by the region determination unit 306 in step S803 (NO in step S803), the processing proceeds to step S807. In step S807, the scroll control unit 305 acquires a scroll position from the browser 301 and performs scroll-movement of the display region on the browser 301 so as to display the upper left of the structured document file, as illustrated in FIG. 6A. In step S808, the display region acquisition unit 304 acquires a new display region 601.

In step S809, the region determination unit 306 determines whether the display region 601 overlaps the print region 503. In the case illustrated in FIG. 6A, the display region 601 overlaps the print region 503 (YES in step S809) and the processing proceeds to step S810. In step S810, the intermediate file generation unit 308 performs rendering of the display region 601 to generate an EMF file. In step S811, the extraction unit 307, based on an amount of movement of scroll-movement by the scroll control unit 305, confirms whether an EMF file already stored in the memory by the extracted region storage control unit 309 is contained in the display region. When the EMF file already stored in the memory is not contained in the display region (NO in step S811), the processing proceeds to step S812. When the EMF file already stored in the memory is contained in the display region (YES in step S811), the processing proceeds to step S814. The processing in step S814 will be described below.

For example, in the case of the display region 601, since the EMF file already stored in the memory is not contained in the display region 601, the processing proceeds to step S812. In step S812, the extraction unit 307 extracts, in the web page, an EMF file of a region where the display region overlaps the print region 503. In step S813, the extracted region storage control unit 309 stores the extracted EMF file in the memory, and the processing proceeds to step S815. In addition, in step S809, also when the region determination unit 306 determines that the display region does not overlap the print region (NO in step S809), the processing proceeds to step S815.

In this way, the image processing apparatus performs extraction and storage of the intermediate file with respect to one display region. Then, processing for moving the display region by the scroll control unit 305 will be described.

In step S815, the scroll control unit 305 determines whether it is possible to scroll the display region to the right. When the scroll control unit 305 determines that it is possible to scroll the display region to the right (YES in step S815), then in step S816, the scroll control unit 305 controls the scroll to move to the right only a horizontal width of the display region. When the scroll control unit 305 determines that it is not possible to scroll the display region to the right only the horizontal width of the display region, the scroll control unit 305 controls the scroll to move to the right only a distance possible to be moved. Further, in step S815, when the scroll control unit 305 determines that it is not possible to scroll the display region to the right like the display region 603 (NO in step S815), then in step S817, the scroll control unit 305 controls the scroll to move to the leftmost. In step S818, the scroll control unit 305 determines whether it is possible to scroll the display region 601 down. When the scroll control unit 305 determines that it is possible to scroll the display region 601 down (YES in step S818), then in step S819, the scroll control unit 305 controls the display region 601 down only a vertical width of the display region 601. When the scroll control unit 305 determines that it is not possible to scroll the display region down only a vertical width of the display unit, the scroll control unit 305 controls the display region 601 to scroll down only a distance possible to be moved.

After the scroll-movement, then in step S808, the display region acquisition unit 304 acquires again the display region after the scroll-movement. In the example illustrated in FIGS. 6A to 6C, as illustrated in FIG. 6B, the scroll control unit 305 controls the display region 601 to perform scroll-movement to the right only a horizontal width of the display region and acquires a display region 602. Similarly to the display region 601, since the display region 602 contains a region (a region 610) overlapping the print region 503, an EMF file corresponding to the display region 610 is stored in the memory by the processing in steps S808 to S813.

Then, the processing proceeds to step S815 and the scroll control unit 305 performs again scroll-movement. A display region 603 illustrated in FIG. 6B is a region in which the scroll control unit 305 controls the display region 602 to perform scroll-movement to the right in step S816. However, since the scroll control unit 305 cannot perform scroll-movement only the horizontal width of the display region, the scroll control unit 305 performs scroll-movement only a distance possible to be moved in the web page. An overlapping region of the display region 603 and the print region 503 becomes a region of a region 612 as illustrated in FIG. 6C. However, an EMF file corresponding to the region 610 is already stored in the memory. Thus, in step S811, the extraction unit 307 determines that there is an already extracted and stored EMF file in a display region (YES in step S811), and the processing proceeds to step S814. In addition, the extraction unit 307 can perform the determination by determining whether an amount of scroll-movement is smaller than the width of the display region. Further, the extraction unit 307 can acquire information indicating coordinates of the print region in the web page and perform the determination based on the coordinates of the print region and the size of the display region.

Further, the intermediate file generation unit 308 can generate an intermediate file containing information indicating coordinates of a corresponding region in the web page, and store the intermediated file in the memory, based on information indicating a display region in the web page which is acquired by the display region acquisition unit 304. When an intermediate file contains the information indicating coordinates of a corresponding region in the web page, the extraction unit 307 can compare coordinates in the web page of the intermediate file and perform the determination based on the information contained in the intermediate file stored in the memory. Thus, various determination methods are possible.

In step S814, the extraction unit 307 extracts an EMF file of the print region 611 excluding an region corresponding to an EMF file already stored in the memory. In the display region, a portion for extracting the EMF file can be determined by an amount of scroll-movement or determined based on the coordinates of the print region and the size of the display region in the web page. Further, a portion for extracting the EMF file can be determined based on coordinates of a region corresponding to an intermediate file in the web page, in which the coordinates are indicated by the intermediate file stored in the memory.

Further, in step S813, when the extracted region storage control unit 309 stores the EMF file extracted in step S814 in the memory, the processing proceeds to step S815, and scroll-movement is performed again. As a display region 603 illustrate in FIG. 6B, when the scroll control unit 305 cannot perform scroll-movement to the right, then in step S817, the scroll control unit 305 moves the scroll to the leftmost and controls the display region to be the display region 601. In step S818, the scroll control unit 305 determines whether it is possible to perform scroll-movement of the display region 601 down. In step S819, when the scroll-movement is possible, the scroll control unit 305 controls the display region 601 to scroll down only the vertical width of the display region and moves to a display region 604.

Accordingly, when processing in steps S808 to S819 is repeated, the scroll control unit 305 can move the display region to the regions 605 to 609 illustrated in FIG. 6B. The scroll control unit 305 performs rendering of each display region and can store an EMF file of an extracted region overlapping the print region in the memory. After the scroll control unit 305 moves the display region to the region 609, the scroll control unit 305 controls the display region to perform scroll-movement to the left up to a display region 607 because it is impossible to perform scroll-movement to the right. In this case, the flowchart ends because it is impossible to move the scroll down in step S818. In addition, the scroll-movement by the scroll control unit 305 is not limited to the present embodiment. For example, the scroll control unit 305 can move the display region to a display region 604 without moving from the display region 603 to the display region 601 at one time. Further, the scroll control unit 305 can move the display region from the display region 603 to the display region 606.

FIG. 7 illustrates an intermediate file stored in the memory. The EMF file corresponding to each display region by the processing indicated in the flowchart illustrated in FIG. 8 is stored in the memory. As indicated by a file 701, the print control unit 314 combines a plurality of EMF files and performs drawing processing with respect to the printer driver 311, so that the print control unit 314 can control the printer 104 to print an image in the web page corresponding to the print region 503.

In addition, in step S814, the extracted region storage control unit 309 does not perform extraction and storage of EMF files in a portion corresponding to the EMF files already stored in the memory, in the display regions in the web page. Thus, when the print control unit 314 outputs an image based on a plurality of EMF files as illustrated in FIG. 7, it is not necessary to consider an overlap of the corresponding regions in the web page in a plurality of EMF files.

However, in step S814, the extracted region storage control unit 309 can store, in the memory, an intermediate file corresponding to the whole display region in the web page. In such a case, the extracted region storage control unit 309 can store, in the memory, information indicating coordinates of a region corresponding to the intermediate file in the web page. When the intermediate file contains information indicating coordinates of the corresponding region in the web page, the extracted region storage control unit 309 can perform the determination by comparing the coordinates of the intermediate file in the web page based on the information contained in the intermediate file stored in the memory.

In addition, an intermediate file in the present embodiment uses an EMF format, but a portable document format (PDF) or an XML paper specification (XPS) can be used. A generation method of intermediate data by PDF and XPS can be generated by a conventional technique similar to EMF.

Further, in the above description, when the CPU 201 stores an image corresponding to a print region, the region displayed in web page is changed by performing scroll-movement, as illustrated in FIGS. 6A to 6C. However, when the CPU 201 executes processing of scroll-movement for storing an intermediate file in the memory, the CPU 201 can control the scroll-movement so as not to display the scroll-movement on the display apparatus 206.

Figure 9:
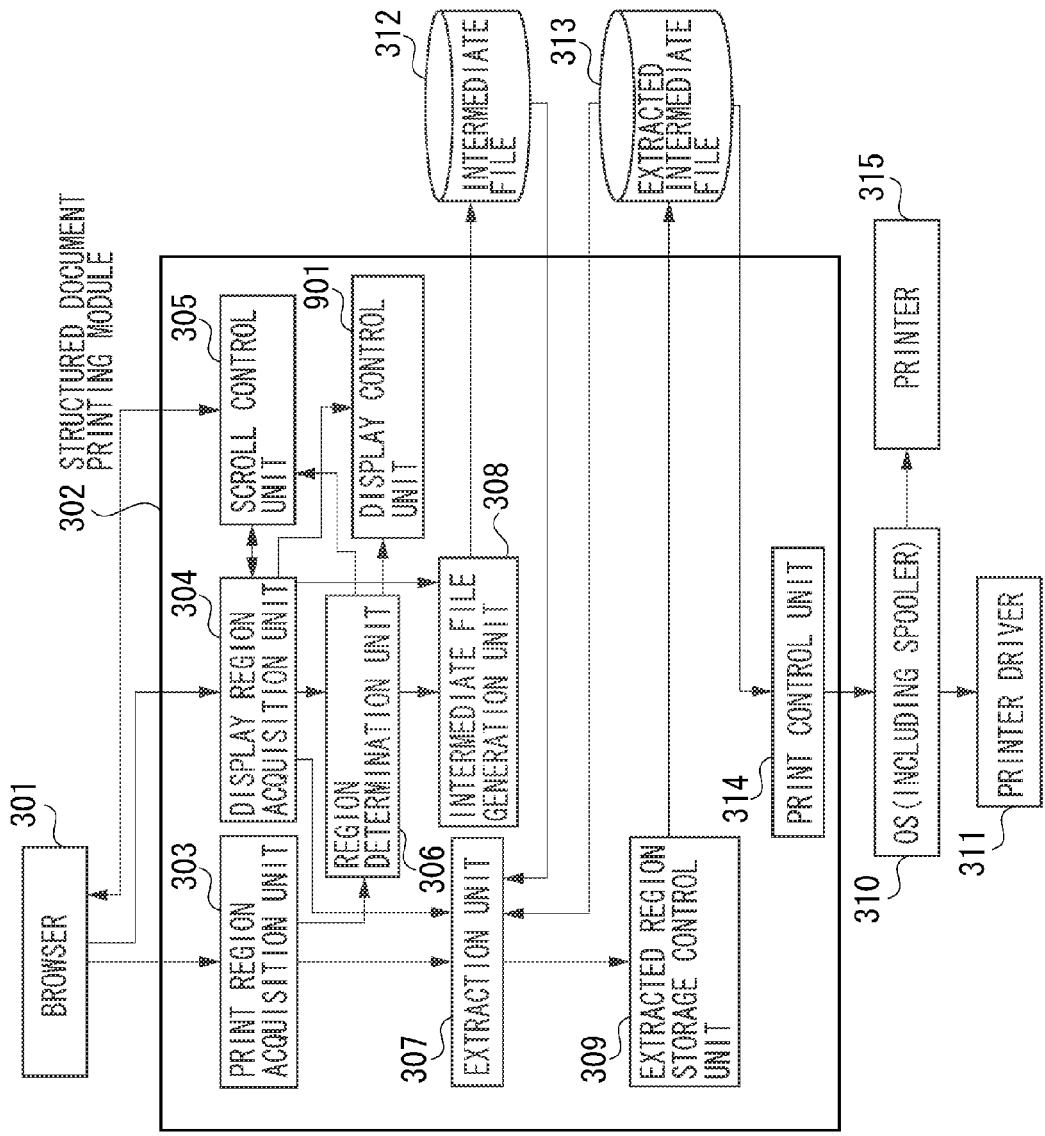
FIG. 9 illustrates a software configuration on a PC.

FIG. 9 illustrates a software configuration on the PC 101. The configuration is configured so as not to display, on the display apparatus 206, the scroll-movement for storing the intermediate file in the memory. In blocks illustrated in FIG. 9, the configuration is different in that the structured document printing module 302 further includes a display control unit 901, compared with the software configuration illustrated in FIG. 3. In addition, about blocks having functions similar to those in FIG. 3, detailed description will be omitted.

The display control unit 901 stores, in the memory such as the RAM 202, information indicating a display region acquired by the display region acquisition unit 304 when the structured document printing module 302 is started. As for the timing, for example, it can be after the display region acquisition unit 304 acquires a display region in step S801 in the flowchart illustrated in FIG. 8, or after the region determination unit 306 determines that the print region is not contained in the display region in step S807, i.e., after the region determination unit 306 determines to perform scroll-movement.

In steps S807, S816, S817, and S819, when the scroll control unit 305 performs scroll-movement, the display control unit 901 performs control so as not to change an image displayed on the browser 301. As for the method, for example, in data processed by the scroll control unit 305, the display control unit 901 can control data indicating a display region for displaying on the display apparatus 206 so as not to be changed from the already stored data indicating the display region. In other ways, the display control unit 901 can perform control so as not to change display with respect to the browser 301 until storing of an image corresponding to a print region ends.

Figure 10:
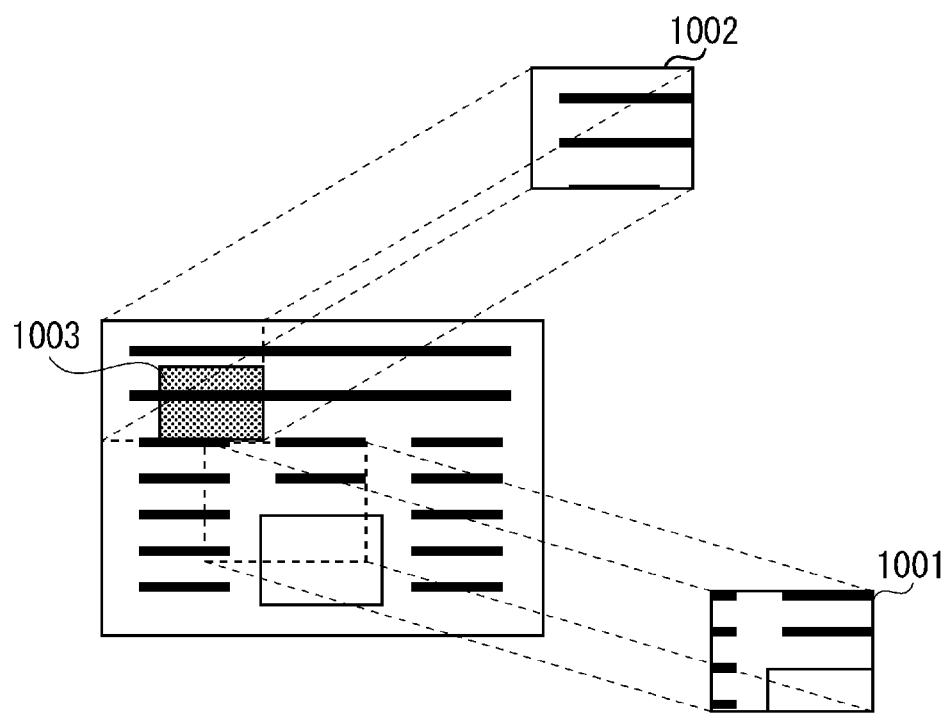
FIG. 10 illustrates display control by a display control unit.

FIG. 10 illustrates display control by the display control unit 901. For example, in step S807 illustrated in FIG. 8, the scroll control unit 305 acquires a scroll position from the browser 301, and controls a region 1002 in FIG. 10 to perform scroll-movement to the upper left corner on the web page so as to become a display region. Then, an intermediate file corresponding to the region 1003 is generated as described above.

Further, when the scroll control unit 305 performs such scroll-movement, the display control unit 901 stores information indicating a region 1001 which is an acquired display region. Then, even when the scroll-movement is performed and the display region moves to the region 1002, the region 1001 is actually displayed.

Then, the display region displayed in such steps is not changed and the same processing as that illustrated in FIG. 8 is executed. More specifically, while the image actually displayed on the display apparatus 206 by the browser 301 is fixed, the scroll control unit 305 performs scroll-movement so as to display the print region of the web page which is not displayed on the screen, changes the display region, and generates an intermediate file.

Then, when the processing illustrated in FIG. 8 ends, the scroll control unit 305 moves the scroll position to the display region stored by the display control unit 901, and cancels the control for fixing the display screen by the display control unit 901.

According to the present embodiment, the print control unit 314 can execute printing of the print region without a user being conscious of scroll.

In addition, in the above-described embodiment, the image processing apparatus extracts a region overlapping a print region in a display region and stores the extracted region. However, the method is not limited and, for example, the image processing apparatus can perform mask processing for storing an image in a display region and replacing a region not overlapping a print region with predetermined pixel values.

In addition, in the above-described embodiment, a case in which processing is performed by the PC 101 is described. However, the present invention is not limited to this configuration. Processing can be performed by the printer 104. In such a case, a control unit in the printer 104 executes processing as an image processing apparatus according to an exemplary embodiment of the present invention, and a printing unit in the printer 104 becomes a printing apparatus for printing an image. Furthermore, in the above-described embodiment, a web page downloaded from the server on the Internet is described. However, the present invention is not limited to this configuration. The present invention can be applied to an application that cannot perform rendering of the whole of a generated page when a part of the page is displayed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-155311 filed Jun. 30, 2009, which is hereby incorporated by reference herein in its entirety.

What is claimed is:

1. An apparatus comprising:
    a processor;
    a web page acquiring unit configured to acquire a web page containing a plurality of regions for display;
    a region acquisition unit configured to acquire information indicating an output region to be output in the web page acquired by the web page acquiring unit, wherein the output region of the web page overlaps at least a first display region and a second display region of the plurality of regions for display by a web browser;
    a display acquisition unit configured to acquire information indicating a current display region of the plurality of regions for display, wherein the current display region is one of the plurality of regions;
    a determining unit configured to determine, using the processor, an overlapping portion where a portion corresponding to the output region and the current display region overlap each other in the web page based on the information acquired by the region acquisition unit and the display acquisition unit;
    an extraction unit configured to extract, from the plurality of regions for display, the overlapping portion determined by the determining unit;
    a scroll control unit configured to change the current display region from the first display region to the second display region;
    an image generation unit configured to generate an image comprising each overlapping portion extracted from the first display region and the second display region by the extraction unit, the extracted portions being combined to form an image of the output region; and
    an output unit configured to output the image corresponding to the output region in the web page, based on the image generated by the image generation unit.

2. The apparatus according to claim 1, wherein the generated image is vector data corresponding to the output region in the web page.

3. The apparatus according to claim 1, wherein the output unit is configured to output the image corresponding to the output region to a printing apparatus to print the image.

4. The apparatus according to claim 1, wherein the extraction unit extracts the overlapping portion each time the scroll control unit performs changing.

5. The apparatus according to claim 4, further comprising a storage control unit configured to store the image in a memory each time the current display region is changed by the scroll control unit.

6. The apparatus according to claim 1, wherein, in a case where an entire output region is not included in a displayed region, the scroll control unit performs changing and the output unit performs outputting based on the image generated by the image generation unit.

7. The apparatus according to claim 1, wherein the region acquisition unit acquires information that indicates an output region which is already designated.

8. The apparatus according to claim 1, wherein the region acquisition unit acquires information that indicates an output region designated by a user.

9. The apparatus according to claim 1, wherein, in the plurality of regions for display which become displaying targets according to changing by the scroll control unit, a region displayed when the changing is performed and a region not displayed according to the changing are included.

10. The apparatus according to claim 9, wherein, when the changing by the scroll control unit is performed, a region which was displayed before the changing is performed is displayed and a region after the changing is performed is not displayed.

11. The apparatus according to claim 9, further comprising a display control unit configured to deactivate restriction of the change of display based on a finish of extraction by the extracting unit.

12. A method comprising:
    acquiring a web page containing a plurality of regions for display;

acquiring information indicating an output region to be output in the acquired web page, wherein the output region overlaps at least a first display region and a second display region of the plurality of regions for display by a web browser;

acquiring information indicating a current display region of the plurality of regions for display, wherein the current display region is one of the plurality of regions;

determining an overlapping portion where a portion corresponding to the output region and the current display region overlap each other in the web page based on the acquired information indicating the output region and the current display region;

extracting the overlapping portion from the plurality of regions for display;

changing the current display region from the first display region to the second display region;

generating an image comprising each overlapping portion extracted from the first display region and the second display region, by combining the extracted portions to form an image of the output region; and outputting the image corresponding to the output region in the web page, based on the generated image.

13. A non-transitory computer-readable storage medium storing a program for causing a computer to execute a method comprising:

acquiring a web page containing a plurality of regions for display;

acquiring information indicating an output region to be output in the acquired web page, wherein the output region overlaps at least a first display region and a second display region of the plurality of regions for display by a web browser;

acquiring information indicating a current display region of the plurality of regions for display, wherein the current display region is one of the plurality of regions;

determining an overlapping portion where a portion corresponding to the output region and the current display region overlap each other in the web page based on the acquired information indicating the output region and the current display region;

extracting the overlapping portion from the plurality of regions for display;

changing the current display region from the first display region to the second display region;

generating an image comprising each overlapping portion extracted from the first display region and the second display region, by combining the extracted portions to form an image of the output region; and outputting the image corresponding to the output region in the web page, based on the generated image.

* * * * *